(No Model.)
R. TONGE.
PISTON AND PLUNGER.
No. 383,783. Patented May 29, 1888.
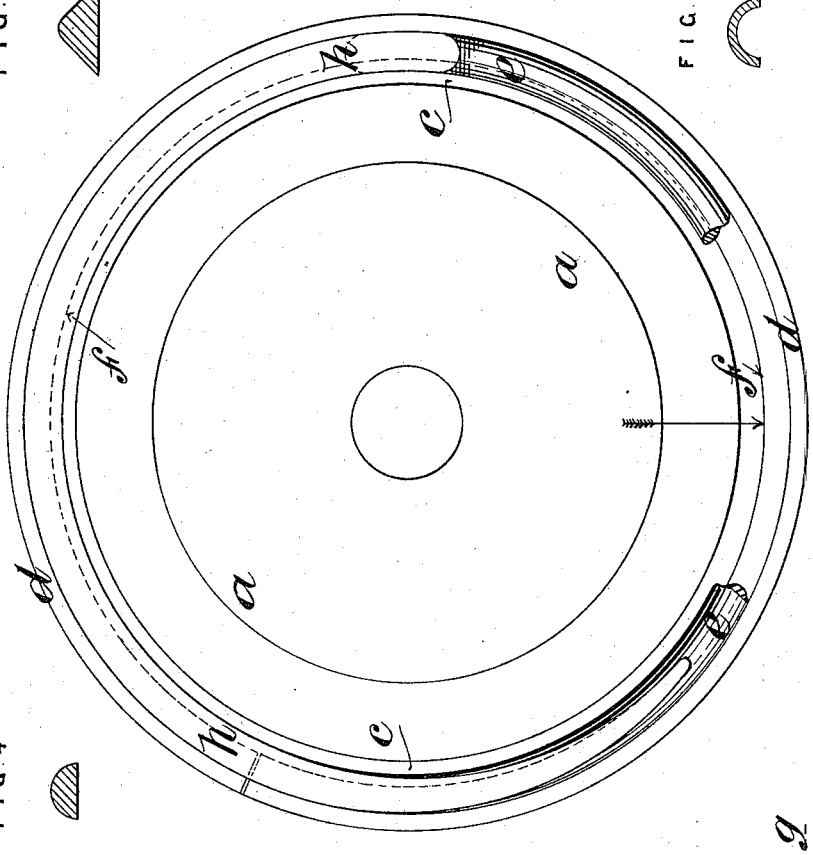
Witnesses: B. J. Reynolds. Wm. Chester Wills.
Inventor R. TONGE —
by his Attys. Howson and Howson

UNITED STATES PATENT OFFICE.

RICHARD TONGE, OF ALDERLEY EDGE, COUNTY OF CHESTER, ENGLAND.

PISTON AND PLUNGER.

SPECIFICATION forming part of Letters Patent No. 383,783, dated May 29, 1888.

Application filed December 20, 1887. Serial No. 258,469. (No model.) Patented in England July 13, 1887, No. 9,822.

*To all whom it may concern:*

Be it known that I, RICHARD TONGE, a subject of the Queen of Great Britain and Ireland, and residing at Alderley Edge, county of Chester, England, merchant, have invented certain Improvements in Pistons and Plungers, (for which I obtained a patent in Great Britain, No. 9,822, dated July 13, 1887,) of which the following is a specification.

My said invention relates to pistons and plungers, and refers to the springs and rings employed to prevent the passage of fluid under pressure from one side of the piston or plunger to the other.

Figure 1 is a cross-section of a piston made in accordance with my invention and having a packing-spring of improved sectional shape. Fig. 2 is a side view of the piston with the cover removed, so as to show the spring in position, a portion of the spring being removed in the drawings to show the ring more clearly behind. Fig. 3 is a view of the coiled packing-spring removed from the piston.

The piston is formed of two parts—the piston-block $a$ and the cover $b$. In each of the parts $a$ and $b$ a recess is formed, so that when the two parts $a$ and $b$ are put together the groove $c$ appears, which contains the packing-rings $d\ d$ and spring $e$.

When an ordinary piston of the type illustrated in the drawings is used in a horizontal engine, it sometimes happens that the piston settles down by its own weight, so as to rub on the cylinder. To prevent this I form ledges $f\ f$ on the sides of the groove $c$, which ledges come opposite to the inner edges of the rings $d\ d$. Now, suppose that the dotted line $g\ g$ in Fig. 1 represents the interior of the cylinder, and that the piston tends to drop in the direction of the arrows. The ledges $f\ f$, bearing upon the inner edges of the rings $d\ d$, support the piston on the rings and prevent it from coming into rubbing contact with the cylinder. The spring $e$ is made of round steel rod coiled upon a mandrel, and then turned or ground, so as to flatten the ends at $h\ h$, as clearly shown at Fig. 3, and as represented by the unshaded portion of the spring appearing in Fig. 2. The spring is then tempered so as to have the requisite resilience. When compressed in the groove $c$ and surrounded by the rings $d\ d$, the spring exerts both an outward pressure tending to pack the rings $d\ d$ against the interior of the cylinder and a side-long pressure tending to pack the rings against the sides of the groove $c$, thus preventing the steam or other fluid from passing either over or under the rings $d\ d$. The curved or rounded back of the section of steel from which the spring is coiled reduces the area of contact between the spring and the rings, and prevents them from sticking together, as they might do if the back of the spring were flat or of large area.

For convenience of manufacture, I prefer to coil the spring $e$ from a rod of steel of a circular section; but I might also coil the spring from a rod of the semicircular section shown at Fig. 4, or from the triangular section shown at Fig. 5, or from the semi-tubular section shown at Fig. 6, as all of these sections would present the requisite rounded or reduced back to the packing-rings $d\ d$.

It has been proposed to provide a piston having rings with an internal spring made of a rod of circular or other section, but in the form of a ring-coil. The axis of the coil being itself a ring in the circumferential groove of the piston, the spring is somewhat limited in its capacity for acting on the packing-rings against the cylinder and the edges of the groove in the piston. My improved spring is a simple spiral coil, whose axis is coincident with the axis of the piston, so that it can act to its full extent to press the packing-rings against the interior of the cylinder, and also against the edges of the groove in the piston.

I claim as my invention—

1. A piston or plunger having a groove provided with ledges $f$ at the sides, in combination with packing-rings $d$ within the groove, and having edges to bear upon the said ledges to support the piston or plunger, all substantially as described.

2. A piston or plunger having packing-rings, and an internal spiral spring whose axis is coincident with the axis of the piston, the spring being a coiled rod of circular, semicircular, triangular, or semi-tubular section, as and for the purpose set forth.

3. A piston or plunger composed of the body $a$ and cover $b$, and formed with a groove, $e$, and ledges $f\ f$, in combination with the rings $d\ d$ within the groove, and having edges to bear upon the ledges to support the piston and a spring behind the ring, substantially as described.

In testimony whereof I have signed my name to this specification in the presence of two subscribing witnesses.

RICHARD TONGE.

Witnesses:
DAVID FULTON,
FREDK. DILLON.